(12) United States Patent
Nagase et al.

(10) Patent No.: US 6,385,162 B1
(45) Date of Patent: May 7, 2002

(54) OPTICAL DISK

(75) Inventors: Toshihiko Nagase, Tokyo; Katsutaro Ichihara, Yokohama, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/272,783

(22) Filed: Mar. 19, 1999

(30) Foreign Application Priority Data

Mar. 20, 1998 (JP) .......................................... 10-071982

(51) Int. Cl.[7] .............................. G11B 7/24; B32B 3/02
(52) U.S. Cl. ..................... 369/288; 369/283; 428/64.2; 428/64.3; 428/64.4; 430/270.11
(58) Field of Search ................................ 369/288, 283, 369/284; 428/64.3, 694 ML, 694 SC, 64.1, 64.2, 64.4, 64.8; 430/270.11, 270.13, 270.12, 945

(56) References Cited

U.S. PATENT DOCUMENTS

| | | | | |
|---|---|---|---|---|
| 5,383,176 A | * | 1/1995 | Inui et al. | ................. 369/275.4 |
| 5,438,561 A | * | 8/1995 | Van et al. | .................... 369/100 |
| 5,474,874 A | * | 12/1995 | Asai et al. | |
| 5,592,461 A | * | 1/1997 | Tsujioka et al. | ............. 369/126 |
| 5,604,002 A | * | 2/1997 | Tsujioka et al. | ............ 428/64.1 |
| 5,699,342 A | * | 12/1997 | Yagi et al. | ................... 369/116 |
| 5,709,978 A | * | 1/1998 | Hirotsune et al. | ..... 430/270.13 |
| 5,717,662 A | * | 2/1998 | Nishimura | .................... 369/13 |
| 5,747,136 A | * | 5/1998 | Shono et al. | ............... 428/64.3 |
| 5,761,172 A | * | 6/1998 | Minemura et al. | ............. 369/59 |
| 5,790,513 A | * | 8/1998 | Hiroki et al. | ............. 369/275.2 |
| 5,958,649 A | * | 9/1999 | Hirotsune et al. | ..... 430/270.13 |
| 5,985,401 A | * | 11/1999 | Yamamoto et al. | ......... 428/64.1 |
| 6,014,360 A | * | 1/2000 | Yonekubo et al. | ........... 369/112 |
| 6,187,406 B1 | * | 2/2001 | Ichihara et al. | ............. 428/64.1 |

FOREIGN PATENT DOCUMENTS

| | | |
|---|---|---|
| JP | 5-242524 | 9/1993 |
| JP | 7-287870 | * 10/1995 |
| JP | 8-129778 | * 5/1996 |

* cited by examiner

*Primary Examiner*—William Klimowicz
(74) *Attorney, Agent, or Firm*—Oblon, Spivak, McClelland, Maier & Neustadt, P.C.

(57) ABSTRACT

An optical disk which operates which two of more different wavelengths, comprising a disk substrate on which tracks are formed at a track pitch of not more than 0.5 μm corresponding to light with a short wavelength, a super-resolution film whose transmittance changes due to irradiation of light, and a recording layer, wherein the transmittance of the super-resolution film changes due to the irradiation of light with a long wavelength. In this optical disk, information recorded by light with a short wavelength can be reproduced by light with a long wavelength.

19 Claims, 3 Drawing Sheets

OPTICAL DISK

BACKGROUND OF THE INVENTION

The present invention relates to an optical disk which is operated with two different wavelengths of a short wavelength and a long wavelength.

An optical disk memory which achieves reproducing or recording/reproducing of information by irradiation of a light beam has been put into practical use as a storage medium for audio, video, and computer data files which realizes a large capacity, high-speed access, and portability. The optical disk memory is therefore expected to develop more in the future. High-density techniques for an optical disk are considered to involve shortening of the wavelength of a gas laser for cutting a master disk, shortening of the wavelength of a semiconductor laser as an operating light source, improvement of the numerical aperture of an objective lens, and thinning of an optical disk. Further, in a recordable optical disk, there are various approaches such as mark length recording, land-groove recording, and the like.

As a technique capable of effectively achieving high-density of an optical disk, a proposal has been made as to a super-resolution reproduction technique which utilizes medium films. The super-resolution reproduction has originally been proposed as a technique peculiar to a magneto-optical disk. Thereafter, reports were made as to attempts to provide a super-resolution film whose transmittance changes due to irradiation of a reproduction beam in the entering side of the reproduction beam with respect to a recording layer to perform super-resolution reproduction in case of a ROM disk in addition to magnet-optical disk. Thus, it has been revealed that the super-resolution reproduction technique is applicable to all optical disks including a magneto-optical disk, CD-ROM, CD-R, WORM (write once read many), phase change optical disk, and the like.

Super-resolution reproduction techniques are classified into a heat mode system and a photon mode system. Explanation will be made as for examples of conventional super-resolution films which have already been proposed.

In the heat mode system, a phase change material is used as a super-resolution film. The super-resolution film is heated by irradiation of a reproduction beam to cause a phase change, so that an optical aperture smaller than the reproduction beam spot is formed. The shape of the optical aperture follows the isotherm of the super-resolution film. However, since the size of the optical aperture easily changes due to influences from the environmental temperature, it is necessary to perform heat control strictly in compliance with the linear velocity of the optical disk. In addition, it is difficult to obtain sufficient repetition stability in the super-resolution film of the heat mode system because of thermal fatigue caused by reproduction and recording.

In the photon mode system, a photochromic material is used as a super-resolution film, and development or erasure of color based on irradiation of a reproduction beam is utilized to form an optical mask or an optical aperture. In the photochromic material, electrons are excited from a ground level to an excited level of short lifetime by irradiation of light, and further, electrons are transferred from the excited level to a metastable excited level of very long lifetime in which they are captured thereby to cause change in absorption characteristics. Therefore, in order to perform reproduction repeatedly, electrons captured at the metastable excited level must be deexcited to the ground level so that the optical aperture may be closed. However, since a supplemental beam is irradiated for the deexcitation, two-beam operation is required disadvantageously in view of high-speed response. Also, the photochromic material causes transmittance change through complicated processes accompanying atomic migration or change in molecular bonds, and therefore, the repetition stability is limited up to about 10,000 times.

As described above, to realize super-resolution reproduction of an optical disk, it is required that the transmittance change of the super-resolution film is caused within the range of practical reproduction power, the degree of change is large, an optical aperture can be formed within a short time equivalent to about the passing time of the reproduction beam spot, and repetitive reproduction can be performed many times.

Furthermore, shortening of the operating wavelength is essential for high-density of an optical disk. This is for the reason that by achieving the shortening of the wavelength of a semiconductor laser as an operating light source, the spot size of a recording beam becomes small, and recording marks can be formed at a narrow pitch. For example, under the present condition, recording, reproduction, and erasure of DVD-ROM and, DVD-RAM are performed by using a semiconductor laser with a wavelength of about 640 nm. However, to achieve a higher-density in future, there is a large possibility to use a blue semiconductor laser with a wavelength of 410 nm.

Suppose that a recording mark train with a narrow pitch is recorded on an optical disk by using an optical disk drive with a light source wavelength of 410 nm of the future, and this optical disk is reproduced by using an existing optical disk drive with a light source wavelength of 640 nm. In this case, since a reproduction beam with a large spot size is irradiated onto the marks with a narrow pitch, inter-symbol interference becomes large, and it is difficult to obtain a sufficient intensity of the reproduction signal.

Accordingly, even if an optical disk is adjusted so that the recording can be performed by light with a short wavelength, in order to realize an optical disk which operates with a plurality of wavelengths, the recording must be performed at a wider mark pitch than the mark pitch which can be realized by light with a short wavelength to obtain a sufficient reproduction signal by light with a long wavelength, and there is such a problem that the recording density is limited. Thus, it is difficult to provide a compatible optical disk to a plurality of operating wavelengths.

BRIEF SUMMARY OF THE INVENTION

An object of the present invention is to provide an optical disk which can read out information recorded by light with a short wavelength at a narrow pitch, by light with a long wavelength.

According to the present invention, there is provided an optical disk which can operate with at least two different wavelengths, comprising a disk substrate on which tracks are formed at a track pitch corresponding to light with a short wavelength, a super-resolution film whose transmittance changes due to the irradiation of light, and a recording layer, wherein the transmittance of the super-resolution film changes due to irradiation of light with a long wavelength.

In another optical disk of the present invention, the transmittance of the super-resolution film changes due to the irradiation of light with a long wavelength and the irradiation of light with a short wavelength respectively.

In still another optical disk of the present invention, the super-resolution film has a stacked structure comprising a super-resolution film whose transmittance changes due to the irradiation of light with a long wavelength and a super-resolution film whose transmittance changes due to the irradiation of light with a short wavelength.

In the super-resolution film according to the present invention, it is preferable that a region where the transmittance changes due to the irradiation of light with a long wavelength is narrower than a region where the transmittance changes due to the irradiation of light with a short wavelength. Here, the region where the transmittance changes, means the region where the transmittance becomes higher than the initial transmittance, that is, the region (size of an optical aperture) corresponding to the number of irradiated photons larger than the threshold value in the increase of the transmittance accompanied with the number of irradiated photons.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in detail below.

Figures 1, 2, 3:
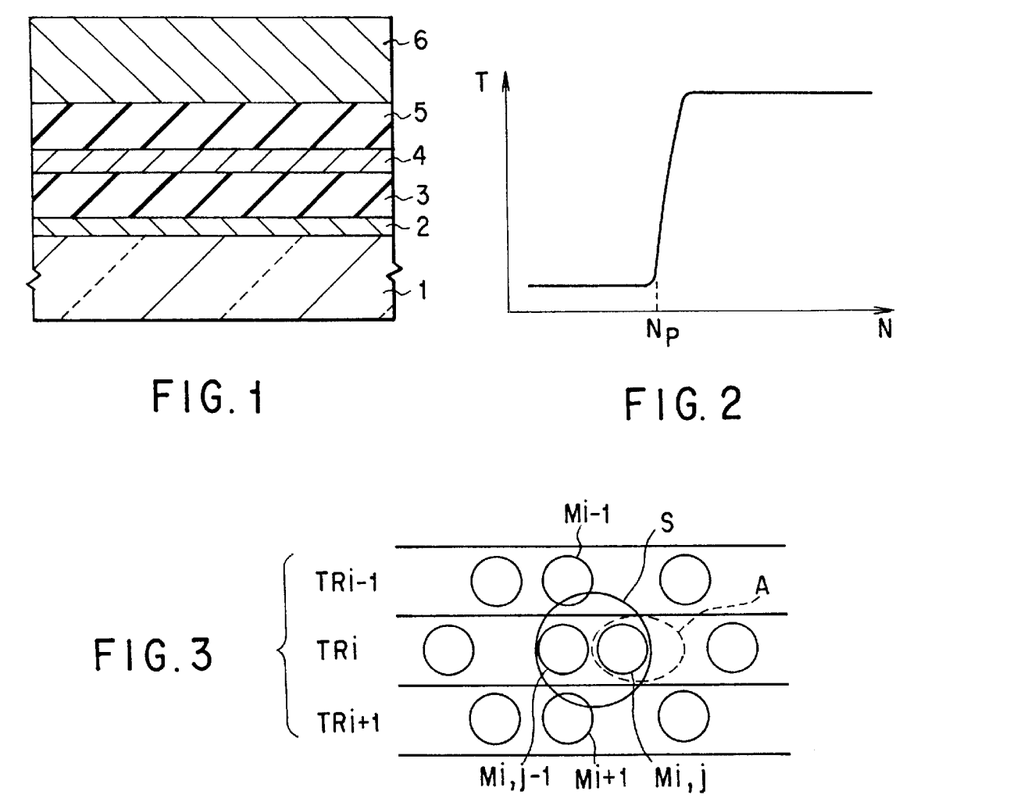
FIG. 1 is a cross-sectional view showing an embodiment of an optical disk according to the present invention.
FIG. 2 is a graph showing the relationship between the number of irradiated photons and the transmittance, as for a super-resolution film used in the optical disk according to the present invention.
FIG. 3 is a view showing the relationship among recording marks, a reproduction beam spot, and an optical aperture, during reproduction of the optical disk according to the present invention.

FIG. 1 shows a cross-sectional view of an embodiment of an optical disk according to the present invention. The optical disk has a structure that a super-resolution film 2, a first interference layer 3, a recording layer 4, a second interference layer 5, and a reflective layer 6 are formed on a disk substrate 1. A reproduction beam enters from the substrate 1 side, passes through the super-resolution film 2 and the first interference layer 3, and is incident on the recording layer 4. Thus, the super-resolution film 2 is formed on the entering side of the reproduction beam relative to the recording layer 4. The reflected light from the recording layer 4 is detected by a photodetector, and the output signal of the photodetector is processed to form the reproduction signal. It should be noted that, in FIG. 1, the super-resolution film 2 is formed in one layer but, as described later, a super-resolution film with a stacked structure may also be used.

FIG. 2 shows the dependency of transmittance (T) on the number of irradiated photons (N) in the super-resolution film. FIG. 2 shows the fact that in the super-resolution film 2, the transmittance sharply changes at the number of irradiated photons Np as a threshold value, and the transmittance is low at the number of photons not more than Np, and the transmittance is high at the number of photons not less than Np. The super-resolution film according to the present invention exhibits the transmittance characteristics shown in FIG. 2 for the reproduction beam with a long wavelength. Furthermore, the super-resolution film according to the present invention may exhibit the transmittance characteristics shown in FIG. 2 not only to a reproduction beam with a long wavelength but also to the reproduction beam with a short wavelength. Note that, in the case where the super-resolution film is made of a material of the heat mode system, the abscissa in FIG. 2 indicates the film temperature.

FIG. 3 shows the relationship among recording marks, a reproduction beam spot, and an optical aperture, during reproduction of the optical disk in FIG. 1 having the super-resolution film exhibiting the characteristics shown in FIG. 2. In FIG. 3, TR denotes recording tracks, and $TR_i$ is a track being reproduced, and $TR_{i-1}$ and $TR_{i+1}$ are tracks adjacent to $TR_i$. The symbol S denotes an $e^{-2}$ diameter of a reproduction beam spot. The symbol M denotes recording marks formed in the recording layer. In the optical disk used in the present invention, the track pitch is narrow in compliance with the recording/reproducing by a laser beam with a short wavelength. More specifically, the track pitch is not more than 0.5 $\mu$m. Furthermore, the recording marks are also formed at a narrow pitch by the recording beam with a short wavelength. Therefore, as shown in FIG. 3, when a reproduction beam with a long wavelength is irradiated, two of more recording marks exist in the spot diameter. Accordingly, in an optical disk having no super-resolution film, inter-symbol interference is large and the recording marks cannot be discriminated individually.

In the case where the super-resolution film according to the present invention is provided, when the power of a reproduction beam with a long wavelength is properly set, the transmittance becomes high only in a region where the number of irradiated photons is large. This number of irradiated photons is a number of photons integrated over the passing time of the disk with respect to the reproduction beam spot. In FIG. 3, the transmittance is high in the region A, and light does not substantially pass in the region other than the region A. The portion of recording layer where the reproduction beam spot S and the region A are overlapped contributes to the reproduction signal. Therefore, in the present invention, even recording marks of a high density which has been recorded by a recording beam with a short wavelength and which cannot be discriminated in an optical disk having no super-resolution film, can easily be discriminated. Furthermore, in a conventional optical disk, a cross talk with the recording marks $M_{i-1}$ and $M_{i+1}$ on the adjacent tracks also arises, but in the present invention, a cross talk with the recording marks $M_{i+1}$ and $M_{i+1}$ on the adjacent tracks does not arise.

Furthermore, in the case where a super-resolution film whose transmittance changes due to each of the irradiation of light with a long wave length and the irradiation of light with a short wave length, is used, or in the case where a super-resolution film having a stacked structure of a super-resolution film whose transmittance changes due to the irradiation of light with a long wavelength and a super-resolution film whose transmittance changes due to the irradiation of light with a short wavelength is used, the super-resolution reproduction is also possible even by light with a short wavelength.

Note that, FIG. 3 shows a state where the optical aperture is formed after the beam spot has passed, since it takes some response time until the transmittance changes after the irradiation of light, but in the case where the response time is very short, the optical aperture is formed within the beam spot.

A material for a super-resolution film is properly selected from heat mode materials such as a phase change material or a thermochromic material, and photon mode materials such as a photochromic material, a photo breaching material, a semiconductor film, and, a semiconductor particle dispersed film.

The phase change material is one whose transmittance changes between crystalline and amorphous states. Examples of the phase change material are chalcogen-based GeSbTe and AgInSbTe. Examples of the, photochromic material are pyrobenzopyran, fulgide, diarylethene, cyclophane, azobenzene, derivatives thereof, and the like.

In the present invention, it is especially preferable to use a super-resolution film consisting of a semiconductor particle dispersed film in which semiconductor particles are dispersed in a dielectric, film, and to utilize the transmittance change due to an absorption saturation phenomenon. The absorption saturation means such a phenomenon that when light is irradiated onto a semiconductor, electrons in the ground state are transferred to the excited state and the excited state is occupied by the excited electrons, and electrons in the ground state are decreased, so that the semiconductor may no longer absorb light. When the absorption saturation arises and light is no longer absorbed, the transmittance of the semiconductor rises. When a reproduction beam is irradiated onto an optical disk having a super-resolution film of the present invention, the absorption saturation arises in the super-resolution film, corresponding to the region in the reproduction beam spot where the number of photons is large, that is, the central portion, and an optical aperture smaller than the reproduction beam spot is formed. The super-resolution reproduction can be performed by detecting a recording mark in the recording layer through the optical aperture.

Since the super-resolution film according to the present invention utilizes the phenomenon that electrons in a semiconductor are transferred from the ground level to an upper level and the absorption saturation arises, whether the semiconductor has an energy gap (forbidden band width) approximately equivalent to the energy of the reproduction beam can be adopted as one of the selection criteria of the semiconductor. Two levels to be concerned with the excitation may be selected from the valence band, an impurity level in the forbidden band, the exciton level, and the conduction band. In the case where a semiconductor particle dispersed film is used as a super-resolution film, a proper semiconductor material is selected according to the operating wavelength of a long wavelength (or a long wavelength and a short wavelength), as well as the particle sizes and the volume content of the semiconductor fine particles are adjusted, so that the energy gap may properly be adjusted.

Table 1 shows forbidden band widths (Eg) of typical semiconductor materials (continuous films) and wavelengths ($\lambda$g) of light corresponding to Eg. In the semiconductor particle dispersed film, the forbidden band width Eg becomes larger as the semiconductor particles become finer.

TABLE 1

|      | Eg (eV)   | $\lambda$g (nm) |
|------|-----------|-----------------|
| ZnO  | 3.44      | 360             |
| ZnS  | 3.84–3.91 | 317–324         |
| ZnSe | 2.83      | 438             |
| ZnTe | 2.39      | 519             |
| CdS  | 2.5–2.6   | 477–496         |
| CdSe | 1.84      | 674             |
| CdTe | 1.607     | 772             |
| AlP  | 2.5       | 496             |
| AlSb | 1.55      | 800             |
| AlAs | 2.3       | 539             |
| GaN  | ≈3.76     | ≈330            |
| GaAs | 1.35      | 919             |
| GaP  | 2.35      | 528             |
| Si   | 1.12      | 1107            |
| SiC  | 2.8       | 443             |

Favorite semiconductor materials used for a super-resolution film for light with a long wavelength (for example, 650 nm) are CdSe, CdTe, AlSb, and GaAs. Favorite semiconductor materials used for a super-resolution film for light with a short wavelength (for example, 410 nm) are ZnSe, ZnTe, CdS, AlP, AlAs, Gap, and SiC.

Note that, the super-resolution film operation can also be performed by utilizing the absorption saturation (super saturation absorption) in organic dyes such as phthalocyanine and 3-diethylthiadicarbocyanine iodide, similarly to the semiconductor particle dispersed film. In this case, it is preferable to use a super-resolution film in which organic dye molecules are dispersed in an organic dielectric film.

In the optical disk of the present invention, materials for the interference layer, for the recording layer, and for the reflective layer are not especially limited. As the material for the interference layer, transparent dielectric such as $SiO_2$, $Si_3N_4$, $Ta_2O_5$, $TiO_2$, or $ZnS$—$SiO_2$ can be used. As the material for the recording layer, magneto-optical material such as TbFeCo, GdFeCo, Pt/Co, MnBi, or garnet ferrite, phase change material represented by GeSbTe or AgInSbTe, and photon mode recording materials represented by the photochromic material can be used. As the material for the reflective layer, metal with a high reflectance represented by Al alloy, Au, Cu or Ag can be used.

The present invention is applicable to a magneto-optical disk, DVD-ROM, DVD-R, DVD-RW, CD-ROM, CD-R, CD-RW, WORM, and the like.

EXAMPLES

Examples of the present invention will be described below with referring to the drawings.

Example 1

A super-resolution film is formed alone on a glass substrate to examined the property thereof. As the super-resolution film, a semiconductor particle dispersed film is used, in which CdTe particles are dispersed in an $SiO_2$ matrix. A glass substrate, a CdTe target, and an $SiO_2$ target are set in a magnetron spattering apparatus. Then, CdTe particle dispersed films having various particle size and volume-content of CdTe particles are formed by adjusting RF power ratio applied to the CdTe target and the $SiO_2$ target in the co-sputtering process. CdTe particle dispersed films are formed, each having a thickness of 50 nm, in which CdTe particles having a size of 5 nm are dispersed in $SiO_2$ matrix with CdTe volume contents of 20 vol %, 50 vol % and 100 vol %, respectively. Here, the volume content of 100 vol % means a CdTe continuous film.

Figure 4:
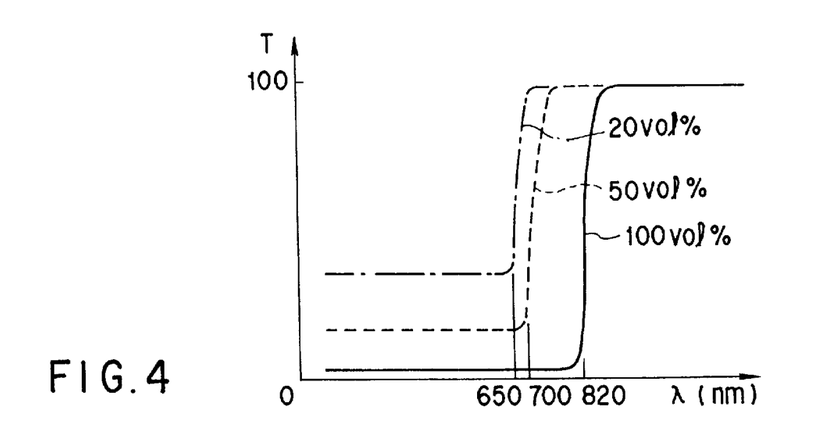
FIG. 4 is a graph showing a wavelength dependence of the transmittance of a CdTe particle dispersed film.

FIG. 4 shows the result obtained by examining the wavelength ($\lambda$) dependency of the transmittance (T) with respect to these films. In the continuous film, the CdTe volume content being 100 vol %, the transmittance sharply changes at the wavelength (about 820 nm) corresponding to the forbidden band width Eg (about 1.5 eV). In dispersed films whose CdTe volume contents are 20 vol % and 50 vol %, the transmittances abruptly change at the wavelengths of about 650 nm and about 700 nm respectively. This is because the forbidden band width Eg becomes larger as the particle size becomes smaller. Furthermore, in the wavelength range of less than 700 nm, the transmittance of the film with CdTe volume content of 20 vol % is higher than that of the film with CdTe volume content of 50 vol%.

Next, CdTe particle dispersed films are formed, each having a thickness of 50 nm, in which CdTe particles having a size of 2 nm, 5 nm and 10 nm, respectively, are dispersed in a $SiO_2$ matrix with CdTe volume content of 50 vol %. Then, wavelength dependency of the transmittance is examined with respect to these films in a same manner as above. As a result, the wavelength where the transmittance sharply changes is shifted to the longer wavelength of 650 nm, 700 nm and 790 nm for particle sizes of 2 nm, 5 nm and 10 nm respectively. This is because the forbidden band width Eg becomes larger as the particle size becomes smaller due to size effect.

Figure 5:
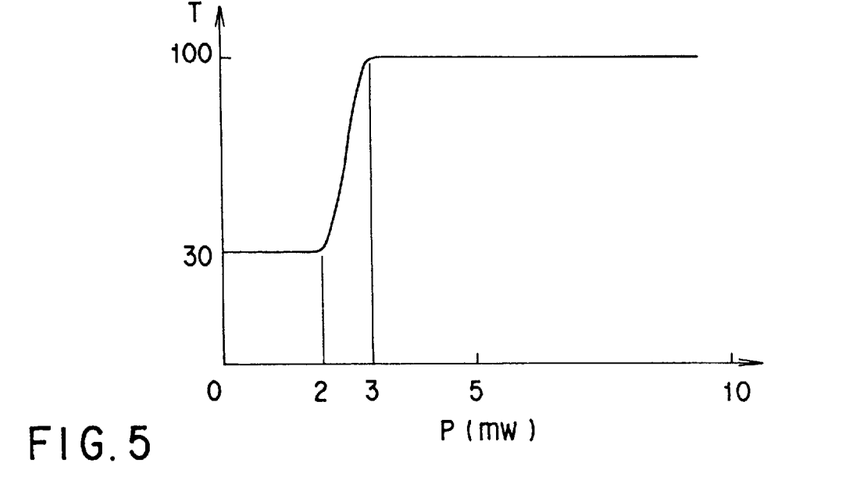
FIG. 5 is a graph showing a reproduction power dependency of transmittance of a CdTe particle dispersed film.

Light with a power up to 15 mW is irradiated by using a semiconductor laser having a wavelength of 650 nm as the light source, to the CdTe particle dispersed film with a particle size of 2 nm and a volume content of 20% formed on a glass substrate, so as to examine the transmittance. FIG. 5 shows the light power (P) dependency of the transmittance (T). It is clear that the transmittance is about 30% at the power not more than 2 mW, but it is about 60% at the power of 2.5 mW and approximately equal to 100% at the power not less than 3 mW. This shows that the absorption of light with a wavelength of 650 nm is saturated at the power not less than 3 mW.

Furthermore, as for this film, time resolution measurement is performed by the pump probe method using pumping light having such intense that the absorption is sufficiently saturated. As a result, the time taken for the transmittance to rise after the irradiation of the pumping light is several ns, and the time taken for the transmittance to return to the level before the irradiation of the pumping light is 30 ns.

Figure 6:
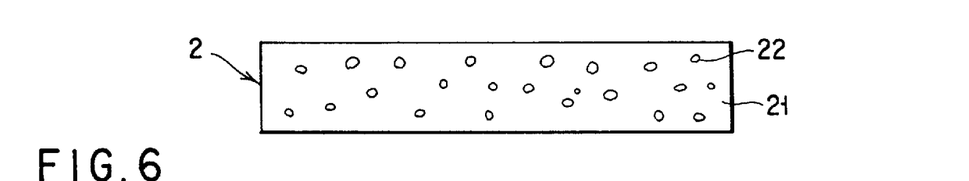
FIG. 6 is a cross-sectional view of a super-resolution film used in EXAMPLE 1.

Next, an optical disk with a structure similar to that in FIG. 1 is manufactured, by using a super-resolution film 2 shown in FIG. 6, made of a CdTe particle dispersed film in which CdTe particles 22 having a particle size of 2 nm are dispersed in the $SiO_2$ matrix 21 with a volume content of 20%.

More specifically, this optical disk is manufactured using a disk substrate 1 in which grooves are formed at a narrow track pitch of 0.45 $\mu$m corresponding to a light source with a short wavelength, on which films are formed by spattering as follows. That is, on the disk substrate 1, a super-resolution film 2 made of a CdTe particle dispersed film with a thickness of 100 nm; a first interference film 3 made of $ZnS$—$SiO_2$ with a thickness of 120 nm; a recording film 4 made of GeSbTe with a thickness of 20 nm; a second interference film 5 made of $ZnS$—$SiO_2$ with a thickness of 30 nm; and a reflective film 6 made of Al alloy with a thickness of 100 nm are formed. The film thickness of each layer of this optical disk is optimized so that recording and erasure can be performed with a wavelength of 410 nm, and the reproduction can be performed with two wavelengths of 410 nm and 650 nm. For a comparison purpose, an optical disk is made, which has a structure similar to that in FIG. 1 except that it has no super-resolution film.

The optical disk is set to a disk evaluating apparatus, the disk is rotated at a linear velocity of 6 m/s, and a recording beam with a wavelength of 410 nm is irradiated from the substrate side by converging the beam through an objective lens having NA of 0.6. The laser beam with a wavelength of 410 nm is obtained by passing the light of a high power semiconductor laser with a wavelength of 820 nm through SHG crystal. Then, mark trains with bit pitches of 0.2, 0.3, 0.4, 0.5 and 0.6 $\mu$m/bit are recorded onto different tracks using a single frequency respectively.

Figure 7:
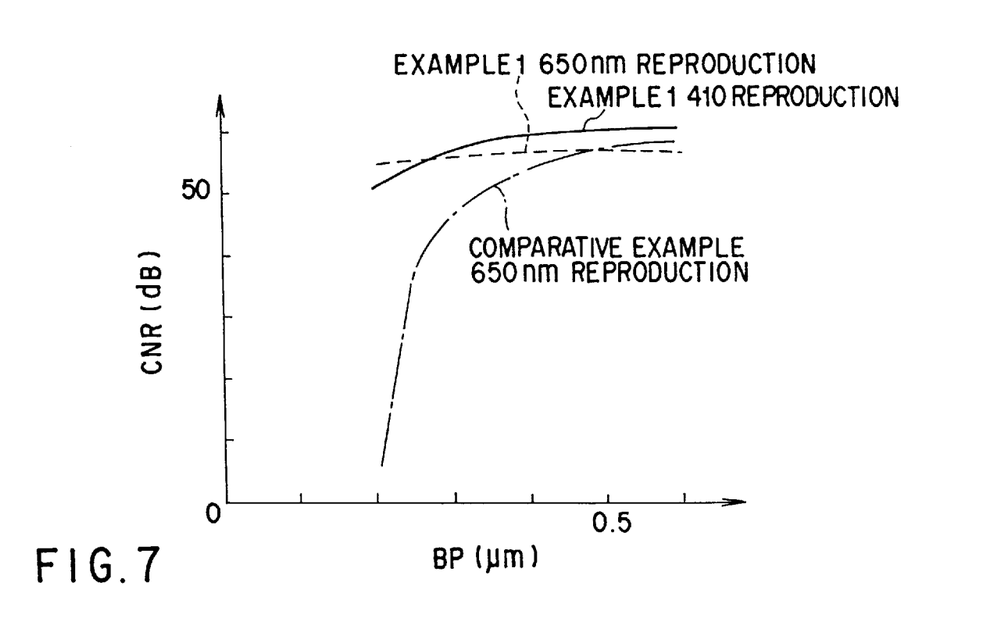
FIG. 7 is a view showing the relationship between a bit pitch and CNR in the optical disk of EXAMPLE 1.

FIG. 7 shows the carrier-to-noise ratio (CNR) when the optical disk is reproduced by reproduction beams with wavelengths of 410 nm and 650 nm. In the optical disk having the super-resolution film of EXAMPLE 1, an approximately equal CNR is obtained both by the reproduction with a wavelength of 650 nm and by the reproduction with a wavelength of 410 nm. However, in the optical disk having no super-resolution film of the comparative example, when the reproduction is performed with a wavelength of 650 nm, CNR is lowered because of inter-symbol interference for recording mark trains whose bit pitches are 0.2 and 0.3 $\mu$m/bit.

Example 2

An optical disk is manufactured, which has the same structure as that of EXAMPLE 1 except that a two-layered super-resolution film comprising a film in which ZnSe particles are dispersed in $SiO_2$ and a film in which CdSe particles are dispersed in $SiO_2$ is used. The forbidden band width Eg of ZnSe is 2.7 eV, which corresponds to the energy of light with a wavelength of 460 nm. The forbidden band width Eg of CdSe is 1.8 eV, which corresponds to the energy of light with a wavelength of 690 nm.

First, the characteristics of a particle dispersed film in which ZnSe particles are dispersed in $SiO_2$ and a particle dispersed film in which CdSe particles are dispersed in $SiO_2$, will be described individually. The ZnSe particle dispersed film or the CdSe particle dispersed film is formed as follows. A glass substrate, an $SiO_2$ target, and a ZnSe target or a CdSe target are set in a magnetron sputtering apparatus. Then, CdTe particle dispersed films or ZnSe particle dispersed films having various particle size and volume content of particles are formed by adjusting RF power ratio applied to the CdTe target or ZnSe target and the $SiO_2$ target in the co-sputtering process.

ZnSe particle dispersed films are formed, each having a thickness of 50 nm, in which ZnSe particles having a size of 7 nm are dispersed in $SiO_2$ with ZnSe volume contents of 20 vol %, 50 vol % and 100 vol %, respectively, so as to examine wavelength dependency of transmittance. Here, the volume content of 100 vol % means a ZnSe continuous film. In the film whose ZnSe volume content is 100 vol %, the transmittance sharply changes at the wavelength (about 460 nm) corresponding to the forbidden band width Eg (about 2.7 eV). In the films whose volume contents of ZnSe particles are 20 vol % and 50 vol %, the transmittance sharply changes at the wavelength of about 440 nm. This is because the forbidden band width Eg becomes larger as the particle size becomes smaller. Furthermore, in the wavelength range of less than 440 nm, the transmittance of the film with ZnSe volume content of 20 vol % is higher than that of the film with ZnSe volume content of 50 vol %.

Next, ZnSe particle dispersed films are formed, each having a thickness of 50 nm, in which ZnSe particles having a size of 3 nm, 7 nm and 10 nm, respectively, are dispersed in $SiO_2$ with ZnSe volume content of 50 vol %. Then, wavelength dependency of the transmittance is examined with respect to these films in a same manner as above. As a result, the wavelength where the transmittance sharply changes is shifted to the longer wavelength of 410 nm, 440 nm and 460 nm for particle size of 3 nm, 7 nm and 10 nm, respectively. This is because the forbidden band width Eg becomes larger as the particle size becomes smaller due to size effect.

On the other hand, CdSe particle dispersed films are formed, each having a thickness of 50 nm, in which CdSe particles having a size of 10 nm are dispersed in $SiO_2$ with CdSe volume contents of 20 vol %, 50 vol % and 100 vol %, respectively, so as to examine wavelength dependency of transmittance. In the film whose CdSe volume content is 100 vol %, the transmittance sharply changes at the wavelength (about 690 nm) corresponding to the forbidden band width Eg (about 1.8 eV). Furthermore, in the films whose volume contents of CdSe particles are 20 vol % and 50 vol %, the transmittance sharply changes at the wavelength of about 650 nm. This is because the forbidden band width Eg becomes larger as the particle size becomes smaller. Furthermore, in the wavelength range of less than 650 nm, the transmittance of the film with CdSe volume content of 20 vol % is higher than that of the film with CdSe volume content of 50 vol %.

Then, CdSe particle dispersed films, are formed each having a thickness of 50 nm, in which CdSe particles having a size of 7 nm, 10 nm and 15 nm, respectively, are dispersed in $SiO_2$ with CdSe volume content of 50 vol %, so as to examine wavelength dependency of transmittance. As a result, the wavelength where the transmittance sharply changes is shifted to the longer wavelength of 620 nm, 650 nm and 670 nm for particle size of 7 nm, 10 nm and 15 nm respectively. This is because the forbidden band width Eg becomes larger as the particle size becomes smaller due to size effect.

Figure 8:
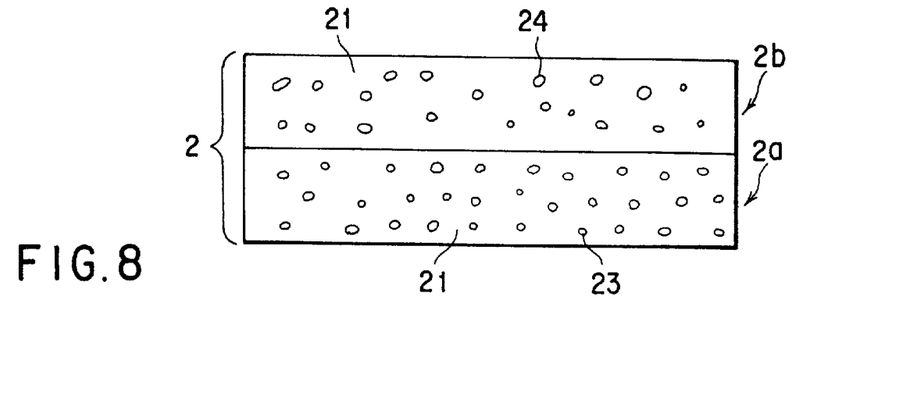
FIG. 8 is a cross-sectional view of a super-resolution film used in EXAMPLE 2.

Next, an optical disk with a structure similar to that in FIG. 1 is manufactured, by using a two-layered super-resolution film 2 shown in FIG. 8, comprising a ZnSe particle dispersed film 2a with a thickness of 50 nm in which ZnSe particles 23 having a particle size of 3 nm are dispersed in a $SiO_2$ matrix 21 with a volume content of 20%, and a CdSe particle dispersed film 2b with a thickness of 50 nm in which CdSe particles 24 having a particle size of 10 nm are dispersed in a $SiO_2$ matrix 21 with a volume content of 20%. This optical disk permits super-resolution reproduction operation with two wavelengths of 410 nm and 650 nm. Furthermore, in this optical disk, the film construction is optimized so that recording and erasure can be performed with two wavelengths of 410 nm and 650 nm. In this case, an optical disk is also used as a comparative example, which has a structure similar to that in FIG. 1 except that it has no super-resolution film.

Figure 9:
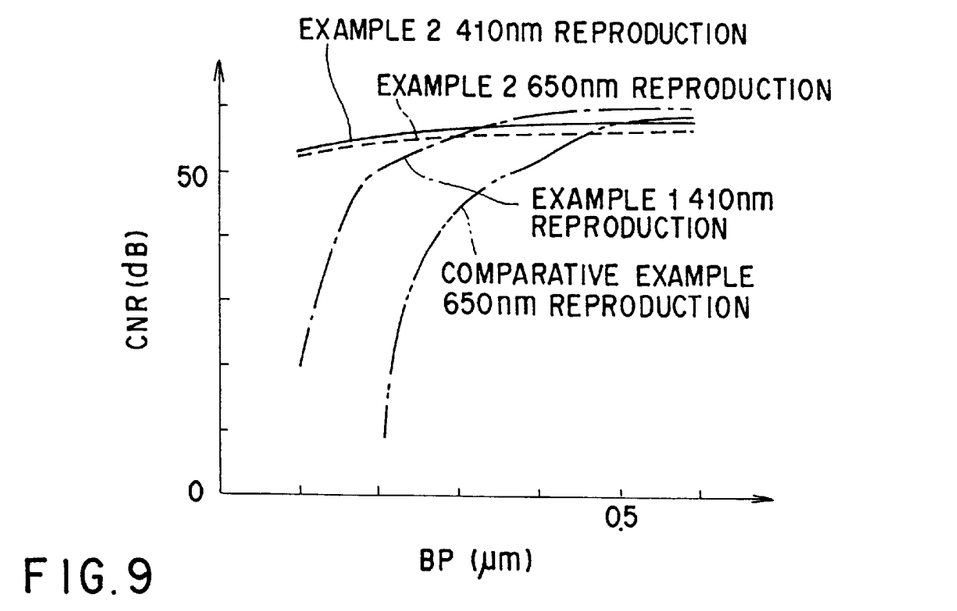
FIG. 9 is a graph showing the relationship between a bit pitch and CNR in the optical disk of EXAMPLE 2.

Similarly to EXAMPLE 1, mark trains with bit pitches of 0.1, 0.2, 0.3, 0.4, 0.5 and 0.6 μm/bit are recorded onto different tracks using a single frequency respectively. FIG. 9 shows CNR when the optical disk is reproduced by reproduction beams with wavelengths of 410 nm and 650 nm. In the optical disk having the super-resolution film of EXAMPLE 2, an approximately equal CNR is obtained both by the reproduction with a wavelength of 650 nm and by the reproduction with a wavelength of 410 nm. However, in the optical disk having no super-resolution film of the comparative example, when the reproduction is performed with a wavelength of 650 nm, CNR is lowered because of inter-symbol interference for recording mark trains whose bit pitch is less than 0.3 μm/bit. Furthermore, in the optical disk having the super-resolution film of EXAMPLE 1, the super-resolution reproduction operation can not be performed with a wavelength of 410 nm, and therefore, CNR is lowered for recording mark train whose bit pitch is 0.1 μm/bit.

Example 3

An optical disk is manufactured, which has the same structure as that of EXAMPLE 1 except that a super-resolution film made of, a particle dispersed film in which particles of two kinds of semiconductors ZnSe and AlSb are dispersed in an $SiO_2$ matrix is used.

First, the characteristics of a particle dispersed film in which AlSb particles are dispersed in $SiO_2$ will be described. The AlSb particle dispersed film is formed as follows. A glass substrate, an $SiO_2$ target and a AlSb target are set in a magnetron sputtering apparatus. Then, AlSb particle dispersed films having various particle size and volume content of particles are formed by adjusting RF power ratio applied to the AlSb target and the $SiO_2$ target in the co-sputtering process.

AlSb particle dispersed films are formed, each having a thickness of 50 nm, in which AlSb particles having a size of 7 mm are dispersed in $SiO_2$ with AlSb volume contents of 30 vol %, 50 vol % and 100 vol %, respectively, so as to examine wavelength dependency of transmittance. In the film whose AlSb volume content is 100 vol %, the transmittance abruptly changes at the wavelength (about 825 nm) corresponding to the forbidden band width Eg (about 1.5 eV). In the films whose volume contents of AlSb particles are 30 vol % and 50 vol %, the transmittance sharply changes at the wavelength of about 730 nm. This is because the forbidden band width Eg becomes larger as the particle size becomes smaller. Furthermore, in the wavelength range of less than 730 nm, the transmittance of the film with AlSb volume content of 30 vol % is higher than that of the film with AlSb volume content of 50 vol %.

AlSb particle dispersed films are formed, each having a thickness of 50 nm, in which AlSb particles having a size of 5 nm, 7 nm and 10 nm, respectively, are dispersed in $SiO_2$ with AlSb volume content of 50 vol %, so as to examine wavelength dependency of the transmittance with respect to these films. As a result, the wavelength where the transmittance sharply changes is shifted to the longer wavelength of 650 nm, 730 nm and 780 nm for particle size of 5 nm, 7 nm and 10 nm, respectively. This is because forbidden band width Eg becomes larger as the particle size becomes smaller due to size effect.

Figure 10:
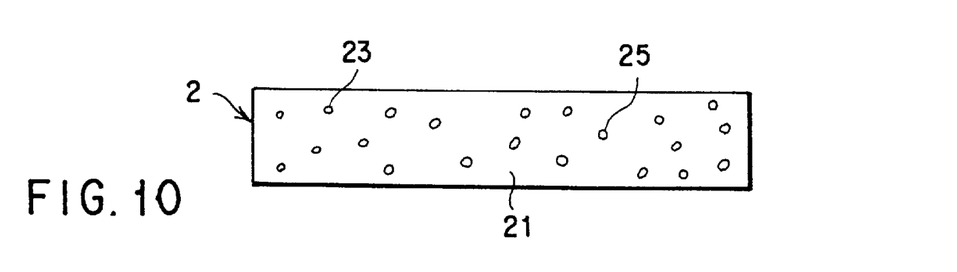
FIG. 10 is a cross-sectional view of a super-resolution film used in EXAMPLE 3.

Next, an optical disk with a structure similar to that in FIG. 1 is manufactured, by using a super-resolution film 2 shown in FIG. 10, made of a particle dispersed film in which ZnSe particles 23 with a particle size of 3 nm and a volume content of 20 vol % and AlSb particles 25 with a particle size of 5 nm and a volume content of 30 vol % are dispersed in the $SiO_2$ material 21.

In this example, the super-resolution film is formed as follows. A glass substrate, an $SiO_2$ target, a ZnSe target and an AlSb target are set in a magnetron sputtering apparatus. Then, super-resolution film having above-mentioned particle size and volume content of particles are formed by adjusting RF power ratio applied to the targets in the ternary co-sputtering process. It is also possible to use a ZnSe—SiO2 mixed target and an AlSb—$SiO_2$ mixed target instead of performing the ternary co-spattering.

In this super-resolution film, at a wavelength of about 650 nm, the transmittance lowers approximately from 100% to 65%, and in a wavelength range of approximately 650 nm to 410 nm, a constant transmittance is maintained, and at a wavelength of about 410 nm, the transmittance lowers approximately from 65% to 30%. That is, the wavelength dependency of the transmittance is shown, which is made by combining the wavelength dependency of transmittance of the ZnSe particle dispersed film and the wavelength dependency of transmittance of the AlSb particle dispersed film. In this optical disk, the film construction is adjusted so that recording, reproduction, and erasure ban be performed with two wavelengths of 410 nm and 650 nm.

Similarly to EXAMPLE 1, mark trains with bit pitches of 0.1, 0.2, 0.3, 0.4, 0.5 and 0.6 μm/bit are recorded onto separate tracks using a single frequency, respectively. When the optical disk is reproduced by reproduction beams with wavelengths of 410 nm and 650 nm, a result similar to that of EXAMPLE 2 is obtained.

In order to perform the super-resolution reproduction operation with two of more different wavelengths, it is sufficient to form an arrangement of two of more layers like EXAMPLE 2 by combining films which show absorption for lights with different wavelengths, and it is also sufficient to form a structure of one layer like EXAMPLE 3 by using a plurality of materials which show absorption for different wavelengths.

In the present example, in order to operate the super-resolution reproduction film with two different wavelengths, a semiconductor particle dispersed film is used, which shows absorption for two different wavelengths by dispersing two kinds of semiconductors. In order to perform the operation with two different wavelengths, it is also sufficient to use a material which shows absorption for two wavelengths. That is, an inorganic material or an organic material which shows absorption for two wavelengths where the super-resolution reproduction film is desired to operate, can be used in principle. In an organic material, for example, copper phthalocyanine permits super-resolution reproduction with different wavelengths by utilizing the absorption range having the central wavelength of 350 nm and the absorption wavelength from 600 to 700 nm. In an inorganic material, for example, a semiconductor permits super-resolution operation with different wavelengths by utilizing a inter-band transition. It is possible not only by utilizing the inter-band transition but also by combining transition to the exciton level or the like. Furthermore, a glass including a coloring material also shows absorption for different wavelengths. For example, in the case where chrome (Cr) is doped in glass, the absorption is exhibited for wavelengths of 400 to 500 nm and 600 to 700 nm. By utilizing these two absorption ranges, the super-resolution reproduction operation with two different wavelengths can be performed.

Furthermore, in the above examples, as the wavelengths for the super-resolution operation, 410 nm and 650 nm are selected, however the present invention is not especially limited by the operating wavelength. In the case where a semiconductor particle dispersed film is used as the super-resolution film, the forbidden band width of the super-resolution film can properly be adjusted according to the operating wavelength.

Example 4

An optical disk is manufactured, which has the same structure as that of EXAMPLE 1 except that a super-resolution film made of, a polymer film in which super saturation absorption dye molecules are dispersed is used.

The super-resolution film is formed as follows. First, a solution is prepared by dissolving DTDCI (3-diethylcarbocyanine iodide) and PMMA (polymethylmethacrylate) in methanol. The solution is spin-coated on a polycarbonate substrate, and then it is sufficiently dried in a clean oven, thereby forming a super-resolution film. Thereafter, similarly to EXAMPLE 1, a first interference layer, a recording layer, a second interference layer, and a reflective layer are formed by spattering, thus an optical disk is manufactured.

When the reproduction operation is evaluated similarly to EXAMPLE 1, an approximately similar CNR is obtained both in the reproduction with a wavelength of 650 nm and in the reproduction with a wavelength of 410 nm. Thus, it is confirmed that even in the case of using a super-resolution reproduction film in which super saturation absorption dye molecules showing the absorption saturation are dispersed in an organic dielectric film, an effect which is similar to that in the case of using a semiconductor particle dispersed film is also obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk that operates with two or more different wavelengths, comprising:
   a disk substrate on which tracks are formed at a track pitch corresponding to light with a short wavelength;
   a super-resolution film in which an optical aperture is formed in a region irradiated with light with a long wavelength, the optical aperture being narrower than a spot size of the long-wavelength light, at least a part of the super-resolution film transmitting the short-wavelength light; and
   a recording layer.

2. The optical disk according to claim 1, wherein the transmittance of said super-resolution film increase due to irradiation of light with a long wavelength and irradiation of light with a short wavelength respectively.

3. The optical disk according to claim 2, wherein said super-resolution film comprises a dielectric film and two kinds of semiconductor particles dispersed in the dielectric film.

4. The optical disk according to claim 3, wherein one of the semiconductor is selected from the group consisting of CdSe, CdTe, AlSb, and GaAs, and the other is selected from the group consisting of ZnSe, ZnTe, CdS, AlP, AlAs, GaP, and SiC.

5. The optical disk according to claim 1, wherein said super-resolution film has a stacked structure comprising a first super-resolution film whose transmittance increase due to irradiation of light with a long wavelength and a second super-resolution film whose transmittance changes due to irradiation of light with a short wavelength.

6. The optical disk according to claim 5, wherein semiconductors included in said first and second super-resolution films are different from each other.

7. The optical disk according to claim 5,
wherein said super-resolution film whose transmittance increase due to irradiation of light with a long wavelength has a structure in which semiconductor particles selected from the group consisting of CdSe, CdTe, AlSb, and GaAs are dispersed in a dielectric film, and
wherein said super-resolution film whose transmittance increase due to irradiation of light with a short wavelength has a structure in which semiconductor particles selected from the group consisting of ZnSe, ZnTe, CdS, AlP, AlAs, GaP, and SiC are dispersed in a dielectric film.

8. The optical disk according to claim 1, wherein a track pitch of tracks formed on said disk substrate is not more than 0.5 μm.

9. The optical disk according to claim 1, wherein said super-resolution film causes increase in transmittance because of an absorption saturation phenomenon.

10. The optical disk according to claim 1, wherein said super-resolution film comprises a dielectric film and semiconductor particles dispersed in the dielectric film.

11. The optical disk according to claim 10, wherein said semiconductor is selected from the group consisting of CdSe, CdTe, AlSb, and GaAs.

12. The optical disk according to claim 1, wherein said super-resolution film comprises an organic dielectric film and organic dye molecules dispersed in the organic dielectric film.

13. The optical disk according to claim 12, wherein said organic dye is a super saturation absorption dye selected from the group consisting of phthalocyanine and 3-diethylthiadicarbocyanine iodide.

14. The optical disk according to claim 1, wherein said super-resolution film comprises a chalcogen-based phase change material.

15. The optical disk according to claim 1, wherein said optical disk has a structure in which a super-resolution film, a first interference film, a phase change optical recording layer, a second interference layer, and a reflective layer are formed on a substrate.

16. The optical disk according to claim 1, wherein information recorded by irradiating light with a short wavelength can be reproduced by irradiating light with a long wavelength.

17. An optical disk that operates with two or more different wavelengths, comprising:
a disk substrate on which tracks are formed at a track pitch corresponding to light with a short wavelength;
a super-resolution film comprising a dielectric film and semiconductor particles dispersed in the dielectric film, an optical aperture being formed in a region of the super-resolution film irradiated with light with a long wavelength, the optical aperture being narrower than a spot size of the long-wavelength light, the super-resolution film transmitting the short-wavelength light; and
a recording layer.

18. An optical disk that operates with two or more different wavelengths, comprising:
a disk substrate on which tracks are formed at a track pitch corresponding to light with a short wavelength;
a super-resolution film of a stacked structure comprising a first super-resolution film having a structure that first semiconductor particles are dispersed in a first dielectric film and a second super-resolution film having a structure that second semiconductor particles are dispersed in a second dielectric film, in which a first optical aperture is formed in a region of the first super-resolution film irradiated with light with a long wavelength, the first optical aperture being narrower than a spot size of the long-wavelength light, the first super-resolution film transmitting the short-wavelength light, and in which a second optical aperture is formed in a region of the second super-resolution film irradiated with the short-wavelength light, the second optical aperture being narrower than a spot size of the short-wavelength light; and
a recording layer.

19. An optical disk that operates with two or more different wavelengths, comprising:
a disk substrate on which tracks are formed at a track pitch corresponding to light with a short wavelength;
a super-resolution film having a structure that first semiconductor particles and second semiconductor particles are dispersed in a dielectric film, the first semiconductor particles causing absorption saturation phenomenon due to irradiation with light with a long wavelength and transmitting the short-wavelength light, the second semiconductor particles causing absorption saturation phenomenon due to irradiation with the short-wavelength light; and
a recording layer.

* * * * *